US010014996B1

(12) United States Patent
Naim et al.

(10) Patent No.: US 10,014,996 B1
(45) Date of Patent: Jul. 3, 2018

(54) DETERMINATION OF BIT ASSIGNMENTS IN MULTI-BIT SYMBOLS TRANSMITTED TO MULTIPLE RECEIVING DEVICES BASED ON CHANNEL CONDITIONS

(71) Applicant: Sprint Spectrum L.P., Overland Park, KS (US)

(72) Inventors: Muhammad Ahsan Naim, Ashburn, VA (US); Yu Zhou, Herndon, VA (US); Luca Zappaterra, Eindhoven (NL)

(73) Assignee: Sprint Spectrum L.P., Overland Park, KS (US)

( * ) Notice: Subject to any disclaimer, the term of this patent is extended or adjusted under 35 U.S.C. 154(b) by 85 days.

(21) Appl. No.: 15/288,073

(22) Filed: Oct. 7, 2016

Related U.S. Application Data

(63) Continuation-in-part of application No. 15/073,268, filed on Mar. 17, 2016.

(51) Int. Cl.
| | |
|---|---|
| H04L 5/00 | (2006.01) |
| H04W 72/04 | (2009.01) |
| H04L 27/26 | (2006.01) |
| H04L 1/00 | (2006.01) |

(52) U.S. Cl.
CPC .......... *H04L 5/0046* (2013.01); *H04L 1/0009* (2013.01); *H04L 5/0035* (2013.01); *H04L 27/2601* (2013.01); *H04W 72/042* (2013.01)

(58) Field of Classification Search
CPC . H04L 5/0046; H04L 5/0035; H04L 27/2601; H04W 72/042
See application file for complete search history.

(56) References Cited

U.S. PATENT DOCUMENTS

| | | | | |
|---|---|---|---|---|
| 2007/0165104 | A1* | 7/2007 | Khan | H04B 7/022 348/14.02 |
| 2010/0177746 | A1* | 7/2010 | Gorokhov | H04B 7/024 370/336 |
| 2010/0285792 | A1* | 11/2010 | Chen | H04W 72/005 455/422.1 |
| 2012/0188888 | A1* | 7/2012 | Wang | H04B 7/024 370/252 |
| 2013/0250885 | A1* | 9/2013 | Davydov | H04B 7/024 370/329 |

(Continued)

*Primary Examiner* — Min Jung

(57) ABSTRACT

A method and system for bit-level protection in concurrent downlink coordinated multipoint transmission of bit groups to multiple user equipment devices (UEs) from multiple base stations. Multiple base stations each serving a respective UE and each having a separate bit stream to communicate to its respective served UE will define bit groups across the bit streams, such that each bit group includes at least one bit from each base station's bit stream. Each bit group will be transmitted as a multi-bit data symbol modulated onto a subcarrier frequency. Susceptibility to pairwise confusion between different data symbols due to misidentification of particular bits will be used to determine bit-level protection for various bit positions of the data symbols. Assignment of particular bits of each bit group to particular UEs will include consideration of bit-level protection, such that UEs with lower quality downlink properties will be assigned bits providing higher bit-level protection, and vice versa.

20 Claims, 8 Drawing Sheets

(56) References Cited

U.S. PATENT DOCUMENTS

| | | | | |
|---|---|---|---|---|
| 2014/0269453 A1* | 9/2014 | Papasakellariou | ... | H04B 7/2643 370/280 |
| 2015/0049698 A1* | 2/2015 | Liu | ...................... | H04L 5/0057 370/329 |
| 2015/0381328 A1* | 12/2015 | Mo | ........................ | H04B 7/024 370/329 |

* cited by examiner

DETERMINATION OF BIT ASSIGNMENTS IN MULTI-BIT SYMBOLS TRANSMITTED TO MULTIPLE RECEIVING DEVICES BASED ON CHANNEL CONDITIONS

CROSS-REFERENCE TO RELATED APPLICATIONS

This application is a continuation-in-part of and claims priority from U.S. patent application Ser. No. 15/073,268 filed on Mar. 17, 2016, which is hereby incorporated in its entirety by reference.

BACKGROUND

Unless otherwise indicated herein, the description provided in this section is not itself prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices (whether or not technically operated by a human user), can operate. In turn, each base station may be coupled with network infrastructure, including one or more gateways and switches, that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In general, a cellular wireless network may operate in accordance with a particular radio access technology or "air interface protocol," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handover of UEs between coverage areas, and functions related to air interface communication.

In accordance with the air interface protocol, each coverage area may operate on one or more carrier frequencies for carrying communications between the base station and UEs. Each carrier frequency could be frequency division duplex (FDD), in which the downlink and uplink operate on separate frequency channels, or time division duplex (TDD), in which the downlink and uplink operate on a shared frequency channel and are distinguished from each other over time. Further, each carrier may be structured to define certain air interface resources for carrying communications.

In a representative OFDMA network, for instance, the downlink in each coverage area is mapped over frequency and time into an array of resource elements in which the base station can transmit data to UEs. In particular, the downlink is divided over frequency into a range of closely-spaced orthogonal subcarriers and is divided over time into a continuum of symbol time segments, thereby defining an array of resource elements each centered on a respective subcarrier and spanning a respective symbol time segment. With this arrangement, as the base station has data to transmit to UEs, the base station may transmit the data in particular resource elements to the UE.

By way of example, in accordance with the LTE protocol, the downlink of each carrier could span a frequency bandwidth such as 1.4 MHz, 3 MHz, 5 MHz, 10 MHz, 15 MHz, or 20 MHz, and the frequency bandwidth is divided into 15 kHz subcarriers (subcarriers spaced apart from each other by 15 kHz). Further, the air interface is divided into a continuum of 10-millisecond (ms) frames, and each frame is divided into ten 1 ms sub-frames or transmission time intervals (TTIs), some or all of which may be used for the downlink. Each 1 ms downlink TTI is then further divided into 14 symbol time segments, each spanning 66.7 microseconds plus an added 4.69 microsecond guard band (cyclic prefix). With this arrangement, each TTI thus defines an array of resource elements, each centered on a 15 kHz subcarrier and spanning a symbol time segment, and each such resource element may effectively carry a single orthogonal frequency division multiplexing (OFDM) symbol representing communication data.

In each TTI, certain ones of these resource elements on the downlink are reserved for carrying particular types of communications. For instance, particular resource elements distributed throughout the downlink bandwidth are reserved for carrying a reference signal that UEs can detect and measure as a basis to determine the quality (e.g., strength) of coverage. Further, across the bandwidth, resource elements in the first one, two, or three symbol segments are reserved to define various control channels, such as a physical downlink control channel (PDCCH) in which the base station provides control signals such as resource allocation directives and the like. And the remaining symbol segments in each TTI are then generally reserved to define a physical downlink shared channel (PDSCH) for carrying data to UEs in accordance with the base station's resource allocation directives.

In addition, the resource elements in each TTI are grouped into physical resource blocks (PRBs), each spanning 12 resource elements (180 kHz) in the frequency domain and 7 resource elements in the time domain, thus defining an array of 84 resource elements—although some may be reserved for special use as noted above. Thus, depending on the downlink bandwidth, the air interface may support transmission on a number of such downlink resource blocks in each TTI. For instance, a 5 MHz carrier may support 25 resource blocks in each TTI, whereas a 15 MHz carrier may support 75 resource blocks in each TTI.

When a UE powers on or otherwise enters into coverage of a base station, the UE and base station may engage in signaling with each other to establish an agreed air interface connection, such as a Radio Resource Control (RRC) connection, through which the base station will then serve the UE. Further, the UE may engage in an attachment or registration process via the base station with the network, which may involve the network authenticating and authorizing the UE and establishing one or more network connections for carrying communications between the UE and one or more transport networks. Having an established air interface connection with the base station, the UE may then be considered to be operating in a connected mode.

With the UE operating in the connected mode, as the base station receives data for transmission to the UE, the base station may select particular air interface resources to carry the data, and the base station may transmit to the UE a resource allocation directive specifying the selected resources and transmit the data to the UE in the selected/specified resources. In LTE, for instance, the base station may select particular PRBs to carry the data in a given TTI, the base station may transmit to the UE in the PDCCH of that TTI a downlink control information (DCI) message that specifies the PRBs, and the base station may transmit the data to the UE in the specified PRBs. The UE may thus read the DCI to determine the PRBs carrying data to the UE, and the UE may then read the data from the specified PRBs.

In addition, in the connected mode, the UE may regularly monitor the quality of the base station's coverage and provide the base station with channel-quality reports, to enable the base station to adapt its air interface transmission with the UE. In particular, the UE may regularly establish and report to the base station a channel quality indication (CQI) based on coverage quality (e.g., signal-to-noise ratio) and other channel attributes, and the base station may map the UE's reported CQI to an appropriate modulation coding scheme (MCS) to be used for air interface communication with the UE, using a predefined CQI-to-MCS mapping table. When the base station has data to communicate to the UE, the base station may then specify the determined MCS in its DCI to the UE and may engage in the transmission accordingly.

The MCS selected by the base station based on the UE's CQI defines a coding rate and a modulation scheme for communicating data from the base station to the UE. In particular, the coding rate defines a rate of usable data communication, taking into account error-correction coding added to help overcome errors in transmission. And the modulation scheme then defines how data will be modulated for transmission on air interface resources to the UE, including how many bits of a coded data stream (sequence of bits) the base station can transmit in each air interface resource, such as with each OFDM symbol. Examples of modulation schemes include (i) Quadrature Phase Shift Keying (QPSK), which represents 2 bits per symbol, (ii) 8PSK, which represents 3 bits per symbol, (iii) 16 Quadrature Amplitude Modulation (16QAM), which represents 4 bits per symbol, and (iv) 64QAM, which represents 6 bits per symbol.

In general, a lower-order MCS, using a lower coding rate (more error-correction data) and/or a modulation scheme in which each air interface resource represents fewer bits, may be more robust and error-tolerant and thus more suitable when the UE's channel conditions are poor. Whereas, a higher-order MCS, using a higher coding rate (less error-correction data) and/or a modulation scheme in which each air interface resource represent a greater number of bits, may be less robust but may provide higher throughput and may thus be more suitable when the UE's channel conditions are good.

OVERVIEW

When a base station is serving a UE, one way to help improve downlink transmission to the UE is to use a coordinated multi-point transmission (CoMP) process, by which the base station and one or more other base stations transmit the same data to the UE concurrently on the same air interface resources, using the same MCS. In particular, when the UE's serving base station schedules data transmission to the UE on particular air interface resources, the serving base station may also provide the data to one or more other base stations and arrange for each other base station to concurrently transmit the same data on the same air interface resources using the same MCS. In this way, although the UE would receive an air resource allocation directive from just its serving base station and may seek to receive the scheduled transmission accordingly, the UE may advantageously receive the transmission coming from both the serving base station and each other base station. This coordinated transmission may thereby add spatial diversity to the transmission, which may help the UE better receive and demodulate the transmission.

A UE receiving CoMP service is referred to herein as a CoMP UE. A CoMP UE's serving base station is referred to variously herein as a primary CoMP base station or just the serving base station, and the other base stations—i.e., other than the CoMP UE's serving or primary CoMP base station—are referred to variously herein as secondary CoMP base stations or just CoMP base stations.

Downlink CoMP may be usefully applied in a situation where a UE is in coverage of both its serving base station and at least one other base station. An example of such a situation is where a distant portion of the serving base station's coverage area overlaps with a distant portion of a neighboring base station's coverage area, and where the UE is positioned in the area of overlap. In that situation, the UE would be in relatively poor coverage of its serving base station and relatively poor coverage of the neighboring base station, but applying CoMP with the serving base station and neighboring base station may help to improve service to the UE. Another example of such a situation is where a small cell base station provides coverage within coverage of a macro base station, and where the UE is positioned within coverage of both of those base stations. There, the UE may be in relatively good coverage of either or both base stations, but applying CoMP may still help to improve service to the UE. Other examples are possible as well.

Related U.S. application Ser. No. 15/073,268 disclosed a variation of this CoMP process that facilitates service of multiple UEs concurrently by multiple base stations. As disclosed therein, when multiple base stations each serve a respective UE and each base station has a separate, different bit stream to communicate to its respective served UE, bit groups will be defined across the base station's bit streams, such that each bit group includes at least one bit from each base station's bit stream. And the base stations will then engage in CoMP transmission of each bit group, with all of the base stations transmitting the bit group at the same time and frequency as each other, such as on the same resource element, using the same modulation scheme. Each UE may then receive that transmitted bit group and process just the appropriate bit(s) destined to the UE, discarding the others.

By having the base stations transmit a given bit group at the same time and frequency as each other, in accordance with example embodiments disclosed in U.S. application Ser. No. 15/073,268, each of the recipient UEs may benefit from the spatial diversity, which may help improve signal-to-noise ratio of transmission to each UE. In turn, that improved signal-to-noise ratio may enable each base station to use a higher coding rate (i.e., with less error-correction coding) for transmission to its served UE. Further, by having each bit group include at least one bit destined respectively to each of the multiple UEs and by having the base stations transmit the bit group at the same time and frequency as each other, such as on the same resource element, the process provides for more concurrent service of the multiple UEs.

It can happen that multiple CoMP UEs receiving identical bit groups in downlink CoMP from a common group of CoMP base stations, as described in U.S. application Ser. No. 15/073,268, do not all have the same downlink channel conditions from their respective serving base stations and/or their respective CoMP base stations. Further, differences in downlink channel conditions of multiple CoMP UEs can apply to aggregate channel conditions as well. Thus, while multiple CoMP UEs all receiving downlink CoMP service from a common group of CoMP base stations may all benefit from enhanced channel conditions (e.g., improved signal-to-noise characteristics) resulting from combined signals from the multiple CoMP base stations, they may nevertheless experience unequal effective (i.e., combined) channel conditions. As one consequence, the multiple CoMP UEs may not all be equally likely to receive and decode identical bit groups without error. In particular, for some types of modulation and coding, including ones used in LTE, certain bit positions in a bit group may be more prone to erroneous reception and/or decoding than others. It would therefore be desirable to account for a CoMP UE's downlink channel conditions when assigning bit positions in bit groups to the CoMP UE.

Accordingly, in one respect, disclosed is a method operable in a wireless communication network including a base station configured for serving one or more user equipment devices (UEs), the method comprising: receiving N respective bit streams, each destined for wireless transmission from the base station to a different one of N UEs, wherein N is a positive integer; subdividing each of the N respective bit streams into a different one of N respective sequences of bit sub-stream groups; determining a quality ranking of respective downlink transmission channel conditions for each of the N UEs, from a best quality to a worst quality; modulation encoding a first bit sub-stream group from each of the N respective sequences into a first single multi-bit modulation data symbol, ordered from least significant bit (LSB) to most significant bit (MSB), wherein a respective bit position of each first bit sub-stream group within the first single multi-bit modulation data symbol is determined prior to modulation encoding based on the quality ranking; and transmitting the first single multi-bit modulation data symbol from the base station simultaneously to each of the N UEs on respective air interfaces to each of the N UEs.

In another respect, disclosed is a method operable in a wireless communication network including at least N base stations configured for serving one or more user equipment devices (UEs), wherein N is a positive integer, the method comprising: receiving N respective bit streams, each destined for wireless transmission from the wireless communication network station to a different one of N UEs; subdividing each of the N respective bit streams into a different one of N respective sequences of bit sub-stream groups; determining a quality ranking of respective downlink transmission channel conditions for each of the N UEs, from a best quality to a worst quality; modulation encoding a first bit sub-stream group from each of the N respective sequences into a first single multi-bit modulation data symbol, ordered from least significant bit (LSB) to most significant bit (MSB), wherein a respective bit position of each first bit sub-stream group within the first single multi-bit modulation data symbol is determined prior to modulation encoding based on the quality ranking; and transmitting the first single multi-bit modulation data symbol from each of the N base stations simultaneously to each of the N UEs on respective air interfaces to each of the N UEs.

And in still another respect, disclosed is a wireless communication network comprising: N base stations configured for serving one or more user equipment devices (UEs), wherein N is a positive integer; one or more processors distributed at least among the N base stations; and memory accessible to the one or more processors, and storing machine language instructions that, upon execution by the one or more processors, cause the wireless communication network to carry out operations including: receiving N respective bit streams, each destined for wireless transmission from the wireless communication network station to a different one of N UEs; subdividing each of the N respective bit streams into a different one of N respective sequences of bit sub-stream groups; determining a quality ranking of respective downlink transmission channel conditions for each of the N UEs, from a best quality to a worst quality; modulation encoding a first bit sub-stream group from each of the N respective sequences into a first single multi-bit modulation data symbol, ordered from least significant bit (LSB) to most significant bit (MSB), wherein a respective bit position of each first bit sub-stream group within the first single multi-bit modulation data symbol is determined prior to modulation encoding based on the quality ranking; and transmitting the first single multi-bit modulation data symbol from each of the N base stations simultaneously to each of the N UEs on respective air interfaces to each of the N UEs.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As a general matter, the disclosed principles can apply in a scenario where two or more base stations provide overlapping coverage, and where each base station serves at least one UE in the area of coverage overlap. With such an arrangement, the base stations and/or one or more other entities could work to establish bit groups each including at least one of the bits destined to each UE as noted above and to coordinate the base stations' CoMP transmission of each bit group to each of the UEs, allowing each UE to process its respective bit(s) in each bit group.

Figure 1:
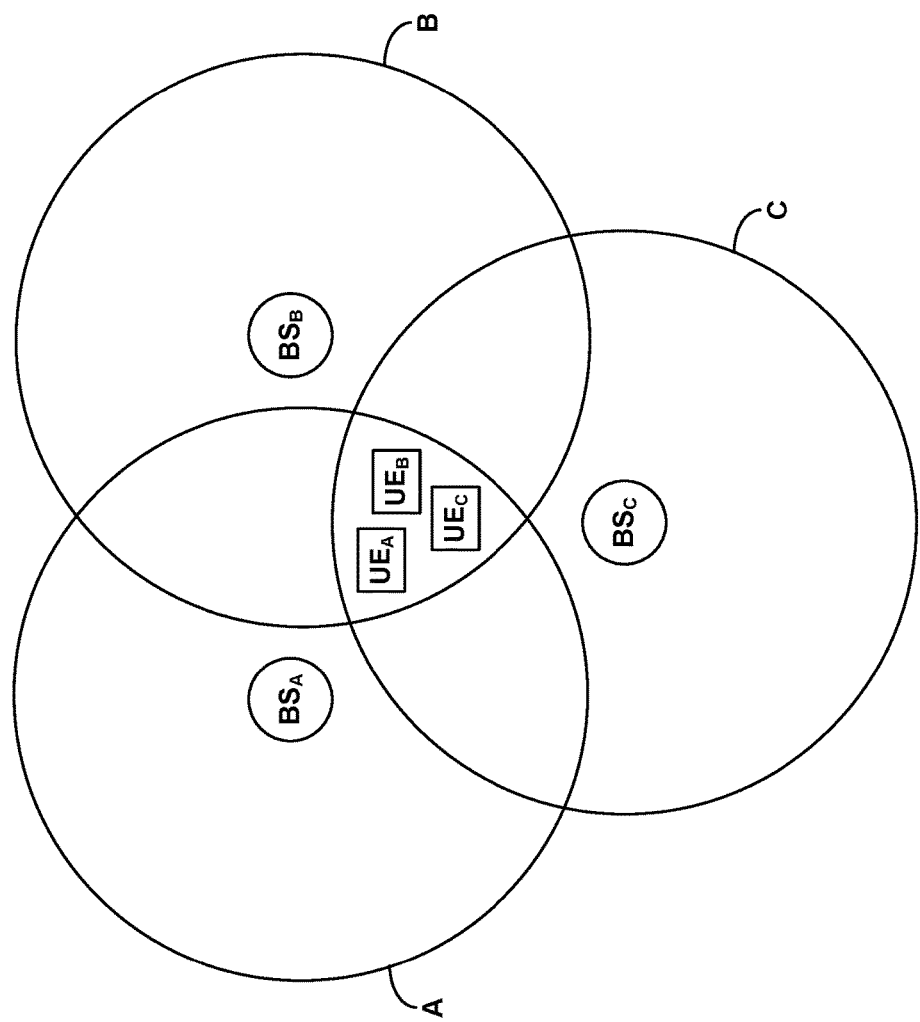
FIG. 1 is a simplified depiction of an example scenario in which multiple base stations each serve a respective UE, with the UEs being in an area of overlap between the base stations' coverage areas.

FIG. 1 is a simplified depiction of such a scenario, where three base stations provide overlapping coverage and where each base station serves a respective UE. In particular, FIG. 1 depicts base stations $BS_A$, $BS_B$, and $BS_C$, providing respective coverage area A, B, and C, and coverage areas A, B, and C are shown overlapping with each other to define an area of overlap. Base station $BS_A$ is then shown serving an example $UE_A$ that is positioned in the area of overlap and can thus receive transmissions from all three base stations, base station $BS_B$ is shown serving an example $UE_B$ that is also positioned in the area of overlap and can thus also receive transmissions from all three base stations, and base station $B_C$ is shown serving an example $UE_C$ that is also positioned in the area of overlap and can thus also receive transmissions from all three base stations.

In this scenario, base stations $BS_A$, $BS_B$, and $BS_C$ provide service on at least the same carrier as each other or otherwise provide service on the same frequency as each other, and the base stations are time synchronized with each other (e.g., according to a common system clock), to facilitate their coordinated transmission. Further, although the figure shows each base station serving just a single UE, in practice each base station may concurrently serve multiple UEs.

In the scenario of FIG. 1, each illustrated UE operates in a connected mode with respect to its serving base station. Thus, $UE_A$ has an established air interface connection, such as an RRC connection, with $BS_A$, and as $BS_A$ receives data to transmit to $UE_A$, $BS_A$ may schedule and provide transmission of the data to $UE_A$ in coverage area A as noted above. Likewise, $UE_B$ has an established air interface connection, such as an RRC connection, with $BS_B$, and as $BS_B$ receives data to transmit to $UE_B$, $BS_B$ may schedule and provide transmission of the data to $UE_B$ in coverage area B as noted above. And $UE_C$ has an established air interface connection, such as an RRC connection, with $BS_C$, and as $BS_C$ receives data to transmit to $UE_C$, $BS_C$ may schedule and provide transmission of the data to $UE_C$ in coverage area C as noted above.

In line with the discussion above, in normal operation, each UE may monitor its serving channel conditions and provide channel quality reports to its serving base station, and its serving base station may then map the reported channel quality to a modulation and coding scheme to use for air interface transmission with the UE. Further, each UE may report to its serving base station the fact that the UE is also within the coverage of the other two base stations, such as by reporting sufficient reference signal strength that the UE detects from each other base station. Thus, each base station may be aware of the UE's presence in each other base station's coverage, and consequently of the possibility of invoking multi-UE CoMP as presently disclosed.

With this arrangement, as noted above, each base station may have a separate respective bit stream (sequence of bits) to transmit to its served UE. For instance, each UE may be engaged in respective unicast communication via the base station with a remote entity such as a network server, and the base station may have buffered some data of that communication to send to the UE. The bit stream that each base station has for transmission to its respective served UE is different than the bit stream that each other base station has for transmission to its respective served UE.

In accordance with the present disclosure, with such an arrangement, a representative implementation may involve multiplexing the bits across the base stations' respective bit streams, defining symbols based on the multiplexed bits, and having all of the base stations send the resulting same symbols as each other at the same time as each other. A UE served by a given such base station could then receive such a symbol and extract just the bit(s) from the bit stream destined to the UE, disregarding the other bits. As noted above, this process may help increase signal-to-noise ratio to each UE, which could thus allow for higher order MCS. Further, the higher order MCS could then help overcome any reduction in throughput that may result from each base station applying this process.

As a simple example of this, consider a scenario where the base stations have the following bit streams (shown here in part) to transmit to their respective served UEs:

Base station $BS_A$ to $UE_A$: 0 1 1 0 0 0 1 1 0
Base station $BS_B$ to $UE_B$: 0 0 1 1 0 1 0 1 0
Base station $BS_C$ to $UE_C$: 1 1 0 0 0 1 0 1 1

From these bit streams, the following bit groups could be established by taking one bit in order respectively from each bit stream:

001 (i.e., the first bit of each stream)
101 (i.e., the second bit of each stream)
110 (i.e., the third bit of each stream)
010 (and so forth)
000
011
100
111
001

Alternatively, each bit group could include a greater number of bits from each or any of the respective bit streams. For instance, each bit group could include 2 bits from each bit stream, or possibly 2 bits from one stream, and one bit from another stream. Other examples are possible as well.

Each base station may then transmit each of these bit groups, with the three base stations using CoMP to transmit each given bit group concurrently on the same air interface resource as each other. For example, for each 3-bit group noted above, each base station may modulate the bit group using 8PSK to generate the same modulation symbol as each other, and all three base stations may transmit the modulation symbol in the same resource element as each other, i.e., at the same time and frequency as each other. Since the three base stations thus concurrently provide the same transmission as each other, each UE may be able to better receive the coordinated transmission.

Each recipient UE may thus receive each transmitted bit group in much the same way as a UE would receive a bit group that carries bits destined to just the UE. But here, each recipient UE would extract from each received bit group just the bit(s) that are from the bit stream destined to the UE, and the UE may discard each other bit of the bit group. To facilitate this, for instance, each UE's serving base station may instruct the UE which bit(s) from each bit group the UE should to read. For instance, the base station may include this instruction in a resource allocation directive such as a DCI that the base station provides to the UE to schedule transmission to the UE. Thus, in the example above, of the three bits represented by each transmitted symbol:

$UE_A$ would extract just the left most bit (and disregard the others)
$UE_B$ would extract just the middle bit (and disregard the others)
$UE_C$ would extract just the right most bit (and disregard the others)

In practice, this multi-UE CoMP process could be coordinated by and among the base stations. Given that the base stations have overlapping coverage, for instance, base station $BS_A$ could be programmed in advance to operate as a master coordinator for the process whenever the process may arise. In practice, then, each base station could learn that its served UE is in coverage of each other base station as well (based on reports from the UE, or in some other manner), and base stations $BS_B$ and $BS_C$ could report to $BS_A$ that that is the case. With possibly additional signaling between the base stations, $BS_B$ and $BS_C$ could then further provide $BS_A$ with copies of the $BS_B$'s and $BS_C$'s respective bit streams. And $BS_A$ could programmatically generate the bit groups and assign each bit group to be transmitted at a particular time and frequency and using a particular modulation scheme such as 8PSK, and $BS_A$ could provide the bit groups and time, frequency, and modulation scheme assignments to $BS_B$ and $BS_C$, to direct CoMP transmission of each bit group.

Each base station may then schedule transmission of each such bit group accordingly to its served UE and may provide the transmission accordingly, thus at the same time and frequency, and using the same modulation scheme, as each other base station. For instance, each base station may transmit to its served UE a resource allocation directive such as a DCI that specifies the assigned time, frequency, and modulation scheme for transmission of the bit group, and each base station may accordingly transmit the bit group at the assigned time and frequency, using the assigned modulation scheme.

In a representative LTE network, as noted above, base stations may allocate resources on a per PRB basis, where each PRB is an array of 84 resource elements each carrying a respective OFDM symbol (although some may be reserved for other use). Given this, a practical implementation of this process may involve coordinating multi-UE CoMP transmission on a per PRB basis. For example, if we assume that there are 80 usable resource elements in each PRB, base station $BS_A$ in the process above could receive from each other base station a sequence of 80 bits from each base station's respective bit stream and could further take a sequence of bits from its own respective bit stream. Base station $BS_A$ could generate a sequence of 80 3-bit bit groups from the three 80-bit sequences, with each bit group including one bit from each of base station's respective 80-bit sequence. Base station $BS_A$ could then assign the 80 bit-groups to the 80 resource elements of a given PRB and could coordinate with base stations $BS_B$ and $BS_C$ to have all three base stations engage in CoMP transmission of that PRB.

This way, all three base stations could thus schedule and engage in transmission of that same PRB (allowing for possible variations if the base stations have different resource elements reserved for reference signal use or the like). Each UE may then respond to its serving base station's resource allocation directive by reading the PRB, which may be a more robust transmission as it would come not only from the UE's serving base station but also from each other base station. And each UE may demodulate the data carried by the PRB and, per instruction from its base station, extract from each 3-bit group just the bit that is destined to the UE, discarding each other bit.

The base stations may carry out this same process for each of a sequence of resource blocks. Thus, possibly on an ongoing basis, for each 80 bits to be transmitted, the base stations may share those bits, and $BS_A$ may generate 3-bit groups and coordinate CoMP transmission of the bit groups on a common PRB for improved receipt by each UE.

Alternatively, the resource allocation for one or more of the UEs at issue could be for just a portion of the PRB rather than for the entire PRB. For example, assuming again that a PRB has 80 usable resource elements, there could be a situation where two base stations have 80 bits to send to their respective UEs but a third base station has just 70 bits to send to its respective UE. In that situation, the base stations could still carry out this process for allocation of a given PRB, but the third base station could direct its served UE to read data from each of the first 70 resource elements of the PRB and not from the remaining 10 resource elements of the PRB. Whereas, the other two base stations could direct their served UEs to each read data from all resource elements of the PRB. To facilitate this in practice, the first two base stations could provide their served UEs with a DCI that allocates the PRB without further qualification (so that those UEs would read data from each resource element of the PRB), but the third base station could provide its served UE with a DCI that allocates the PRB and that further directs the UE to obtain data from just certain specified ones of the resource elements of the PRB rather than from all of the resource elements of the PRB.

In still an alternative implementation, note that this multi-UE CoMP process could be coordinated by one or more other entities. As one example, all three base stations could be configured to more actively participate in the process, such as by all three sharing their bit streams with each other and negotiating with each other to agree on CoMP transmission parameters. As another example, an entity other than the base stations, such as a network server that is part of the supporting network infrastructure noted above or another entity, could be configured to coordinate the process, possibly at the initiation of the base stations upon their learning that the three UEs are all within the coverage overlap area. Such an entity could then receive bit streams that each base station is to transmit to each served UE, and the entity could generate the 3-bit groups as noted above, assign time, frequency, and modulation scheme attributes of the CoMP transmission, and provide the 3-bit groups and CoMP transmission attributes to each base station. And the base stations may engage in CoMP transmission accordingly, including informing their served UEs which bits the UEs are to extract from each bit group.

In addition, in another alternative implementation, note that whichever entity coordinates this could provide each (other) base station with a representation of each 3-bit group rather than with each 3-bit group itself. For example, the entity could itself apply the modulation scheme to generate symbol data such as I and Q symbols representing each 3-bit group, and could provide that symbol data to each (other) base station. Each base station could then use that symbol data as a basis to engage in CoMP transmission of the 3-bit group.

Still further, in another alternative implementation, this process could apply with a different number of base stations. Moreover, a different modulation scheme could be used if other than 3 bits are being grouped together at a time. For example, in a further simplified implementation, just two base stations might provide overlapping coverage, and each base station might serve a respective UE in the coverage overlap. Those two base stations may then work with each other to coordinate multi-UE CoMP service for the two UEs, establishing 2-bit groups cross-wise from the base stations' respective bit streams, and using QPSK to modulate each 2-bit group. And as another example, given a number of base stations with overlapping coverage and applying the process above, the base stations could apply multi-UE CoMP using 16QAM for 4-bit groups or 64QAM for 6-bit groups, still with each bit group including at least one bit from each base station's respective bit stream. Other variations are possible as well.

Note also that, as the multiple base stations involved in this process will likely be different distances from any given one of the UEs, the base stations' time-synchronized transmissions of the same symbols to the UE may arrive at the UE with slightly different delays. As with single-UE CoMP, however, these delays would likely not pose problems, particularly given the narrow 15 kHz band of each symbol transmission, and given the cyclic prefix guard band noted above.

Figure 2:
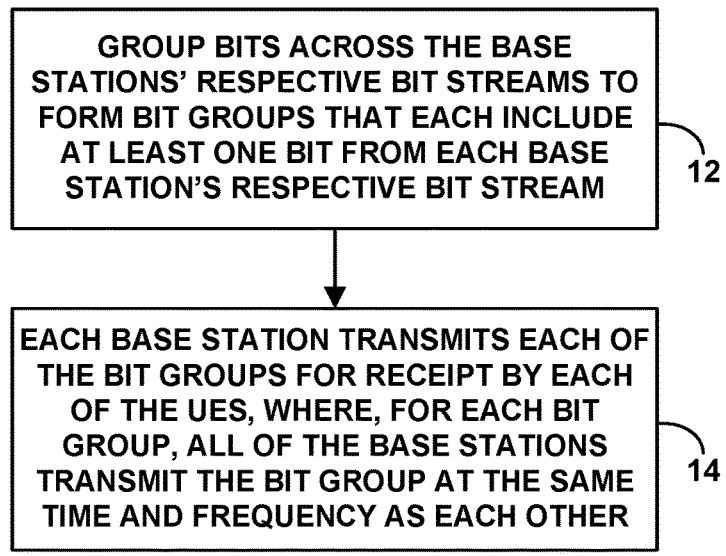
FIG. 2 is a flow chart depicting example operations in accordance with the present disclosure.

FIG. 2 is next a flow chart depicting operations that can be carried out in a method according to present disclosure, to provide CoMP transmission concurrently to multiple UEs from multiple base stations, where each base station serves a respective UE and has a separate respective bit stream to wirelessly transmit to the respective served UE, and where each of the UEs is in coverage of all of the base stations. As noted above, the method could be carried out in response to at least determining that each of the UEs is in coverage of all of the base stations.

As shown in FIG. 2, at block 12, the method includes grouping bits across the base stations' respective bit streams to form bit groups that each include at least one bit from each base station's respective bit stream. And at block 14, the method includes each of the base stations transmitting each of the bit groups for receipt by each of the UEs, where, for each bit group, all of the base stations transmit the bit group at the same time and frequency as each other. Further, in line with the discussion above, for each bit group, all of the base stations optimally modulate the bit group using the same modulation scheme as each other, for air interface transmission.

In line with the discussion above, for instance, the act of all of the base stations transmitting the bit group at the same time and frequency as each other could involve all of the base station transmitting the bit group in a common OFDM resource element. Further, each bit group could include the same number of bits respectively from each base station's respective bit stream, such as two bits including one respectively from each of two base station's respective bit streams (e.g., using QPSK) or three bits including one respectively from each of three base station's respective bit streams (e.g., using 8PSK). Alternatively, each bit group could include a different number of bits respectively from each base station's respective bit stream, such as three bits including two from one base station's respective bit stream and one from another base station's respective bit stream.

Also in line with the discussion above, the base stations may directly or indirectly share their respective bit streams with each other, to enable the base stations to generate and transmit the bit groups. Alternatively or additionally, at least one of the base stations could receive the bit groups from another one of the base stations, to facilitate transmitting of the bit groups by the at least one base station.

And in practice, as also discussed above, the base stations may inform their served UEs which bits from the bit groups the UEs should read, particularly with each base station informing its served UE to read from each bit group the at least one bit from the base station's respective bit stream.

Figure 3:
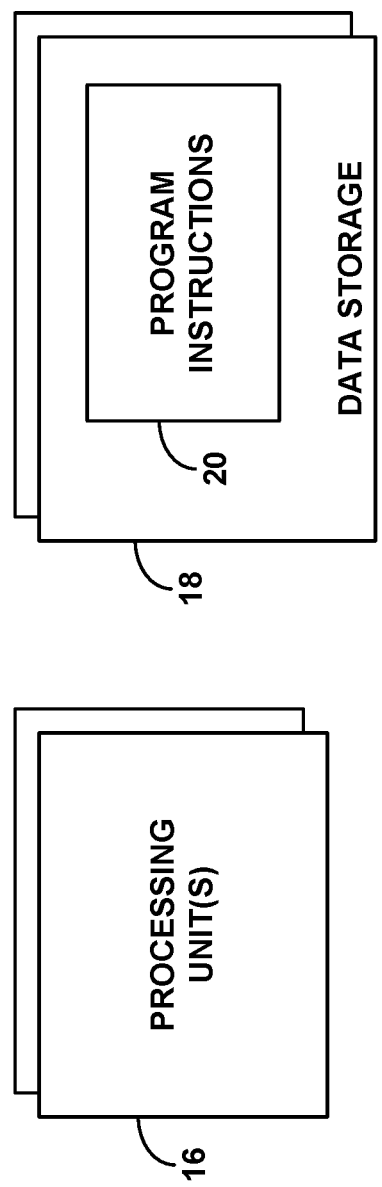
FIG. 3 is a block diagram depicting components of a representative system.

FIG. 3 is next a simplified block diagram of a system for coordinated multipoint transmission concurrently to multiple UEs from multiple base stations, where each base station serves a respective UE and has a separate respective bit stream to wirelessly transmit to the respective served UE, and where each of the UEs is in coverage of all of the base stations. As shown in FIG. 3, the example system includes at least one processing unit 16, at least one data storage 18, and program instructions 20 stored in the at least one data storage and executable by the at least one processing unit to carry out various operations a discussed above. These system components could be provided in conjunction with or as part of one or more of the participating base stations and/or in another entity such as part of the supporting network infrastructure for instance.

The at least processing unit 16 may comprise one or more general purposes processors (e.g., microprocessors) and/or one or more specialized processors (e.g., application specific integrated circuits, etc.) The at least one data storage 18 may then comprise one or more volatile and/or non-volatile non-transitory storage components, such as magnetic, optical, or flash storage, and could be integrated in whole or in part with the at least one processing unit 16. The program instructions 18 may then be executable to group bits across the base stations' respective bit streams to form bit groups that each include at least one bit from each base station's respective bit stream.

And each base station is then configured (e.g., becomes configured per the program instructions, or by use of separate programmed processor control) to transmit each of the bit groups for receipt by each of the UEs, where, for each bit group, all of the base stations are configured to transmit the bit group at the same time and frequency as each other.

In line with the discussion above, for each bit group, all of the base stations may thus be configured to modulate the bit group using the same modulation scheme as each other, for air interface transmission. Further, all of the base stations may transmit the bit group at the same time and frequency as each other by transmitting the bit group in a common OFDM resource element. In addition, each bit group could include the same number of bits respectively from each base station's respective bit stream, such as two or three bits as discussed above. Or one or more of the bit groups could include a different number of bits from the participating base station's respective bit streams, such as one bit from one base station and two bits from another base station for instance.

Moreover, as further discussed above, the base stations may be configured to share their respective bit streams with each other. In at least that case, the at least one processing unit, the at least one data storage, and the program instructions could be distributed among the base stations, so that each base station groups the bits across the base stations' respective bit streams to form the bit groups for transmission. Alternatively or additionally, at least one of the base stations could be configured to receive the bit groups from another one of the base stations, to facilitate transmitting of the bit groups by the at least one base station.

And as discussed above, each base station may be configured to inform its respectively served UE which one or more bits from each bit group the UE should read, the one or more bits being one or more bits from the base station's respective bit stream.

As mentioned above, multiple CoMP UEs receiving identical bit groups as modulation symbols in downlink CoMP from a common group of CoMP base stations may not all have the same downlink channel conditions from their respective serving base stations and/or their respective CoMP base stations. In addition, the multiple CoMP UEs may also experience unequal effective channel conditions of their respective combined downlinks from the CoMP base stations. As a result, the multiple CoMP UEs may not all be equally likely to receive and decode identical bit groups without error.

For some types of modulation and coding, including ones used in LTE, certain bit positions in a modulation symbol (bit group) may be more prone to erroneous reception and/or decoding than others. As such, certain bits in a modulation symbol transmission may be more likely to be received or decoded improperly, while others may be more likely to be received and decoded without error. In these types of modulation and coding schemes, a modulation symbol may therefore be seen as having bit-level protect that depends on bit position in the symbol. Differing degrees of bit-level protection within a modulation symbol relate to how modulation symbols are transmitted over a downlink channel, and, in accordance with example embodiments, may be applied to techniques described above for downlink CoMP transmission of bit groups to multiple CoMP UEs, in order to account and/or compensate for differing effective downlink channel properties seen by the CoMP UEs.

Under LTE (or other OFDM-based technologies), a modulation symbol is transmitted in a given resource element by modulating the subcarrier of the resource element in amplitude and phase during the symbol time for the given resource element. The amplitude and phase of the modulation encodes the modulation symbol's digital value—i.e., bit pattern—on the resource element's subcarrier during the resource element's symbol period. The larger the number of bits per modulation symbol, the larger the number of different amplitude-phase combinations needed to encode the modulation symbol. Hence, given a fixed subcarrier bandwidth (e.g., 15 kHz in LTE) and fixed symbol time (e.g., 66.7 microseconds in LTE), the density of information encoded in a resource element increases as the number of bits per symbol increases. Properly decoding a received resource element to recover the carried modulation symbol—i.e., without error—entails distinguishing among all the possible amplitude-phase combinations of the modulation symbol. And the ability to do so depends, at least in part, on the signal-to-noise characteristics of the transmission channel over which the resource element was received.

A decoding error can occur when a receiver misidentifies the amplitude-phase combination of a received resource element, thereby confusing the received bit pattern with a different one that was not encoded at the transmitting end of the channel. In practice, the likelihood of such a confusion depends, in addition to channel characteristics, on how different (and distinguishable) the amplitude-phase combination that encodes the mistaken modulation symbol is from the amplitude-phase combination that encodes the correct modulation symbol. The greater the similarity between the respective amplitude-phase combinations of the erroneous and correct modulation symbols, the greater the chance that they will be confused by the receiver, and vice versa. Because different modulation symbols correspond to different bit patterns of encoded digital values, the degree of similarity between the respective amplitude-phase combinations of different modulation symbols corresponds to the manner in which the bit patterns differ. As such, certain pairs of bit patterns may correspond to smaller differences between amplitude-phase combinations of their encoded forms than others. This means that certain bit values may be more or less likely to be confused upon decoding depending on their position within a modulation symbol. That is, for a given modulation encoding scheme, the likelihood of confusing any two modulation symbols with each other does not necessarily apply equally to all the bit positions within the symbols.

Figure 4:
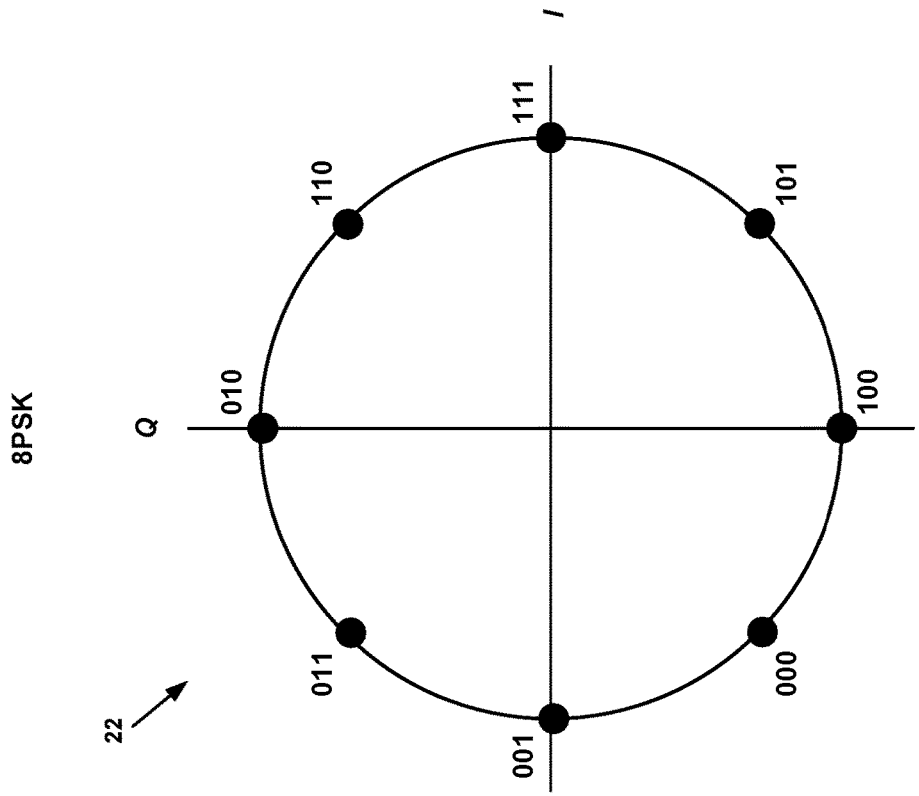
FIG. 4 is a conceptual illustration of data symbol mapping in a first example modulation encoding scheme, in accordance with example embodiments.

FIG. 4 conceptually illustrates bit-level protection for 8PSK, which is taken as the MCS by way of example. 8PSK encodes eight values with three bits, namely: 000, 001, 010, 011, 100, 101, 110, and 111. Here, the right-most bit is the least significant bit (LSB) and the left-most bit is the most significant bit (MSB). The value of each triplet corresponds to a 3-bit modulation symbol, and can be encoded on a subcarrier during a symbol time by a different one of eight amplitude-phase modulation combinations. Mathematically, each 3-bit modulation symbol can be represented as a complex number in a complex plane. Customarily, the real component of each complex modulation symbol is referred to as the in-phase (or I) component and the imaginary component of each modulation symbol is referred to as the quadrature (or Q) component. The set of all eight complex modulation symbols forms a constellation 22 in the I-Q plane, as shown in on the right side of FIG. 4. For the particular case of 8PSK, which serves as an example in FIG. 4, the amplitude is the same for all eight symbols, while only the phase differs among them. Thus, the constellation points of 8PSK lie on a circle, where the radius represents the common amplitude and the angular position of each point represents it phase. The phase difference between each symbol is the same: $2\pi/8=\pi/4$.

The ordering of the different symbol values around the circle can vary depending on the specific form of 8PSK. For the example illustrated in FIG. 4, the order of the symbols, starting on the positive I-axis and progressing counter-clockwise around the circle (i.e., increasing angle and phase) is: 111, 110, 010, 011, 001, 000, 100, and 101. In this arrangement, each pair of adjacent symbols differs from each other by $\pi/4$, which is also the smallest phase difference possible between any two symbols. Thus, when modulated onto a subcarrier and transmitted on a channel, a received modulation symbol is more likely to be confused with one or another of its adjacent symbols than with other symbols of the constellation. For example, a transmitted 111 is more likely to be erroneously decoded as 110 or as 101 than any of the other symbols. This same reasoning applies to subcarrier modulation and transmission of each of the other symbols.

It also happens that each symbol differs from each its immediately adjacent neighbors by the value (0 or 1) of just a single bit. For example 111 differs from neighbor 110 by the value only of the LSB; and 111 differs from neighbor 101 by the value only of the middle bit. It may be seen by inspection that the same applies to other of the constellation symbols as well (i.e., differing from immediate neighbors by the value of a single bit).

While the likelihood of confusing a given modulation symbol with one of its adjacent neighbors is statistically the same for all the constellation points, the number of one-bit misidentifications of symbols is not equally distributed among the three bit positions of the eight symbols. More particularly, there are twice as many one-bit misidentifications of symbols caused by a mistaken bit value (0 or 1) of the LSB than there are for either the middle bit or the MSB. This skewed distribution is illustrated in the table 24 on the left side of FIG. 4. The leftmost column of the table 24 lists all eight adjacent symbol pairs as rows in the table. The next three columns moving toward the right indicate the bit position in each symbol of a given pair that must be mistaken in value in order for the pair members to be confused with each other. An "X" is placed in the bit position for which a mistaken value results in symbol confusion among the pair members. The column for the MSB is bit position "2" (and labeled as such); the column for the middle bit is bit position "1" (and labeled as such); and the column for the LSB is bit position "0" (and labeled as such). The bit position columns are collectively labeled "Δ-Bit." The final row of the table, labeled "Frequency," tallies up the respective occurrences of an "X" in each of the three bit-position columns.

As shown in the example illustrated in FIG. 4, there are two pairs for which a mistaken identification of the MSB will result in confusion between the two pair members; namely, the pairs {110,010} and {000,100}. Similarly, there are two pairs for which a mistaken identification of the middle bit (bit 1) will result in confusion between the two pair members; namely, the pairs {011,001} and {101,111}. In contrast, there are four pairs for which a mistaken identification of the LSB bit will result in confusion between the two pair members; namely, the pairs {111,110}, {010, 011}, {001,000} and {100,101}. Thus, there are twice as many ways for a mistaken value of a LSB bit to cause a misidentification among adjacent symbol pairs than there are for mistaken values of either a MSB or bit or a middle bit.

One consequence of this unequal frequency of occurrence is that a receiver needing to decode only one of the three bits will be more likely to do so correctly for either one of the MSB or middle bits than for the LSB. That is, for the current example of 8PSK, the MSB and middle bits provide higher bit-level protection against error than does the LSB. Since the likelihood of erroneous decoding also depends on downlink channel characteristics, such as signal-to-noise ratio, a statistical likelihood of error due to bit position can be either exacerbated or alleviated by conditions of the channel on which the data symbol is received.

In accordance with example embodiments, this difference in bit-level protection can be applied to the techniques described above for downlink CoMP transmission of bit groups to multiple CoMP UEs by arranging for the CoMP UE with the lowest quality downlink channel conditions—i.e., the one most likely to incorrectly decode a received modulation symbol—to be, as much as possible, assigned bit positions in bit groups that have the highest bit-level protection. Conversely, the CoMP UE with the highest quality downlink channel conditions may be, as much as possible, assigned bit positions in bit groups that have the lowest bit-level protection.

An example of how bit-level protection may be applied can be illustrated by returning to the example of $UE_A$, $UE_B$, and $UE_C$ and their respective serving base stations $BS_A$, $BS_B$, and $BS_C$. One of the base stations, or some other network entity, may determine the effective downlink channel characteristics of each of the UEs resulting from the combined channel transmissions to each respective UE according to CoMP. Supposing, by way of example, that $UE_A$ had the worst effective combined downlink channel—e.g., the worst effective signal-to-noise ratio or some other measure—then $UE_A$ would be assigned either of the MSB or middle bit positions in the CoMP transmissions. This corresponds to the example above, in which $UE_A$ is assigned the MSB position. Conversely, supposing, again by way of example, that $UE_C$ had the best effective combined downlink channel, then $UE_C$ would be assigned either of the LSB position in the CoMP transmissions. This, too, corresponds to the example above, in which $UE_C$ is assigned the LSB position. This bit-to-channel assignment scheme can help ensure that the CoMP UE with the worst downlink channel conditions is assigned a bit position with the highest bit-level protection.

Figure 5:
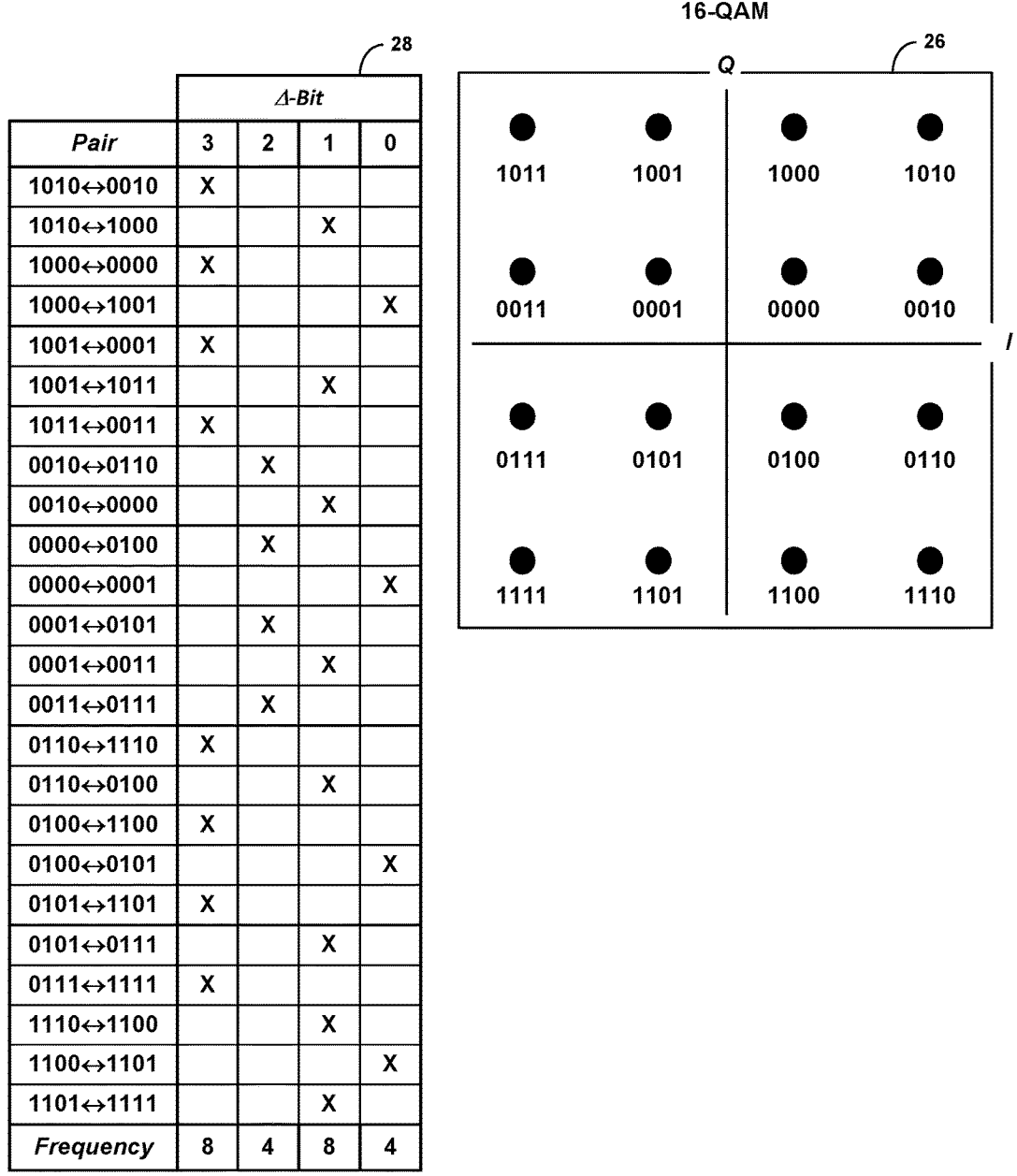
FIG. 5 is a conceptual illustration of a first form data symbol mapping in a second example modulation encoding scheme, in accordance with example embodiments.

Bit-level protection in accordance with the disclosure herein can be extended to higher-order MCSs as well, as illustrated in FIG. 5. By way of example, FIG. 5 shows how bit-level protection may be determined for 16QAM, which encodes four bit per modulation symbol. The general format of FIG. 5 is the same as that of FIG. 4, with a modulation constellation 26 on the right side of FIG. 5 and a table 28 that tabulates frequency of occurrence of one-bit errors that each result in confusion of two modulation data symbols with each other.

The I-Q constellation 26 for 16QAM in FIG. 5 includes 16 complex data points in the I-Q plane. In this case, both phase and amplitude vary from point to point. For the rectangular arrangement of constellation points shown it may be seen that, excluding diagonally adjacent points, there are 24 pairs of points that are immediately adjacent to each other—i.e., offset from each other in I-value only or Q-value only, but not both. The amplitude-phase difference between the two points of each of these 24 pairs is the smallest for any of the possible pairs in the constellation. And, for the particular bit labeling scheme of the 16QAM constellation 26, the modulation symbols of each of these 24 pairs differ from each other by just one bit. The table 28 tallies the frequency of occurrence of one-bit errors for these 24 pairs according to bit position.

In order for a receiver to correctly decode a data symbol, it must be able to distinguish among the 16 possible combinations of amplitude and phase modulated onto a subcarrier. The most likely errors will be between the 24 pairs listed in table 28, since each pair point is closer in amplitude and phase to its pair partner than to any other constellation point. The four bit positions of each data symbol are labeled 0, 1, 2, 3, from LSB to MSB. The last row in table 28 lists the tally of occurrences of one-bit errors for each bit position. As evident from inspection, for this particular example, a mistake bit value (0 or 1) in either of bits 1 or 3 will cause a confused identification in eight pairs of symbols. In contrast, a mistake bit value (0 or 1) in either of bits 0 or 2 will cause a confused identification in four pairs of symbols. Thus, bits 0 and 2 each provide twice the bit-level protection of either of bits 1 or 3.

Extending the example for the three CoMP UEs of FIG. 1 to four CoMP UEs, bit-level protection could be applied by assigning bit positions 0 and 2 to the two CoMP UEs having the worst downlink channel conditions, and assigning bit positions 1 and 3 to the two CoMP UEs having the best downlink channel conditions. Other modes of application of bit-level protection are possible as well. For example, if 16QAM is used with just three CoMP UEs, bit positions 0 and 2 could both be assigned to the CoMP UE having the worst downlink channel conditions, while bit positions 1 and 3 could be respectively assigned to the two CoMP UEs having the best downlink channel conditions. These are not limiting examples of how bit-level protection could be applied.

Figure 6:
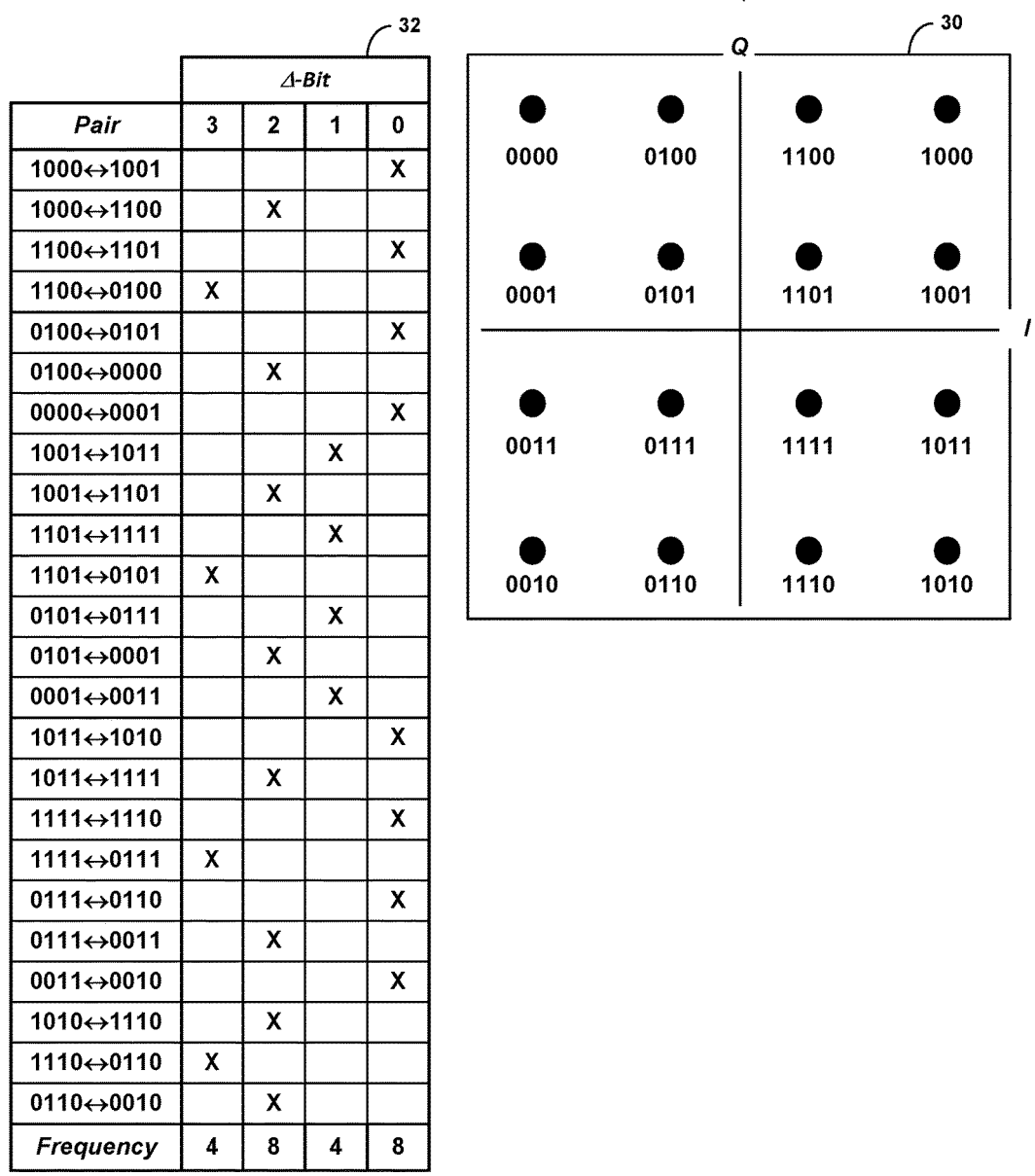
FIG. 6 is a conceptual illustration of a second form data symbol mapping in the second example modulation encoding scheme, in accordance with example embodiments.

FIG. 6 illustrates a different example of 16QAM and how bit-level protection can be applied. The illustration and format of FIG. 6 is the same as that of FIG. 5, except that the 16QAM constellation 30 in FIG. 6 uses as different bit-labeling scheme for the constellation points than that of constellation 26 in FIG. 5. The specific differences are evident from inspection, and are not otherwise described in detail in the present text. It is noted, however, that in the bit-labeling scheme in FIG. 6, immediately adjacent points (offset from each other in I-value only or Q-value only, but not both) again differ by a single bit value. Table 32 in FIG. 6 tabulates the frequency of occurrence of data symbol confusion due to a single bit misidentification within each pair for the 16QAM constellation. In the example of FIG. 6, as is evident from inspection, a mistake bit value (0 or 1) in either of bits 0 or 2 will cause a confused identification in eight pairs of symbols. In contrast, a mistake bit value (0 or 1) in either of bits 1 or 3 will cause a confused identification in four pairs of symbols. As such, bits 1 and 3 each provide twice the bit-level protection of either of bits 0 or 2. Thus, bit-level protection using the 16QAM constellation 30 can be applied in the same way as the 16QAM constellation 26, except that the correlation between the level of protection and bit position differs.

In accordance with example embodiments, differences in the particular bit positions that provide the same bit-level protection among different bit-labeling schemes of otherwise like MCSs (e.g., two or more 16QAM schemes) can be used to assign bit-level protection to specific receiving entities (e.g., CoMP UEs) that may have fixed or pre-assigned bit positions. More specifically, if a particular bit position is assigned to a receiving entity that, for one reason or another, needs or would benefit from bit-level protection associated with a different bit position, the bit-labeling scheme may be changed to accommodate an appropriate change in bit-level protection without changing the bit assignment. This change can be made dynamically, without causing a change in the number of bits per symbol being used at the time the change is made.

Applying bit-level protection by adapting the bit-labeling scheme may be illustrated by way of example by considering the two 16QAM modulation schemes of FIGS. 5 and 6, respectively. As described above, in the 16QAM modulation scheme of FIG. 5 (constellation 26), bit positions 0 and 2 provide the highest level of bit protection, while in the 16QAM modulation scheme of FIG. 6 (constellation 30), bit positions 1 and 3 provide the highest level of bit protection. If a CoMP UE receiving bit groups in accordance to the techniques described above happens to be assigned bit position 1 within the 16QAM scheme 26, but needs a higher level of bit protection, a dynamic and coordinated change among the CoMP base stations to the 16QAM scheme 30 can be made. Doing so will preserve the number of bits per symbol being used (e.g., four for this example) and maintain the bit-position assignments, but will also change the bit level protection to accommodate the needed or required change. That is, the CoMP UE will still be assigned bit position 1 and will still be decoding four bits per symbol. But it will also obtain twice the bit-level protection. Any other CoMP UEs involved in receiving the downlink bit groups according to CoMP will see corresponding changes in their respective bit-level protections (increased or decreased levels).

In accordance with example embodiments, bit-level protection may be applied in conjunction with the coordination and communications between CoMP base stations and CoMP UEs used in the techniques for simultaneous bit-group transmissions to multiple UEs described above. For example, in determining a common MCS to use for downlink transmission to participating CoMP UEs, a determination of downlink channel characteristics for each UE may also be determined. The determined channel characteristics can then be used to determine a ranking of downlink channel quality, from best to worst. In an example, a quality metric could correspond to signal-to-noise ratio, for instance, although other measures could be used as well. Further, the quality ranking can take account of effective or aggregate downlink channel characteristics of each CoMP UE as derived from combined downlink channels from all CoMP base stations.

One or more coordinating network entities that establishes which bits of a bit group to assign to which of the CoMP UEs can also determine, based on the quality ranking, what bit-level protection to assign to each CoMP UE. This determination could be a specific level of protection, or could be a relative ordering of protection based on the quality ranking. For a given MCS and associated number of bits per symbol, bit-level protection could then be applied by assigning CoMP UEs to bit positions based on the protection level of each bit in the modulation symbols of the given MCS. Alternatively, if bit position assignments have already been made, or if specific bit positions assignments need to be made separately from bit-level protection considerations, the bit-level protection can be applied by dynamically adapting the bit-labeling scheme for the given MCS, as described by way of example above. In this case, each CoMP base station can direct its served UE to use the appropriate MCS and bit-labeling scheme in order to correctly extract the assigned bit or bits, while also being afforded the bit-level detection determined in the network.

In accordance with example embodiments, bit-level protection can be extended to other MCSs, such as 64QAM or even 256QAM. Further, a CoMP UE may be assigned multiple bits in modulation data symbols that make up a bit group. In such an application of simultaneous bit-group transmissions, a UE could be assigned bit positions that are not necessarily contiguous, in order to ensure that the UE gets an appropriate level of bit protection. As an example, a CoMP UE might be assigned bits 1 and 3 of the 16QAM constellation 30 in FIG. 6 in order to provide the UE with the highest bit level protection for that scheme. Other configurations of bit-positions assignment and bit-level protection are possible as well.

In further accordance with example embodiments, bit-level protection may be extended to multiple bits of a bit group that are collectively assigned to a particular UE. For example, a CoMP UE might be assigned two or more bits in a modulation data symbol. Multi-bit assignments to multiple CoMP UEs could entail subdividing each respective bit stream destined to one of the CoMP UEs into a respective sequence of bit sub-stream groups, where the size of each sub-stream group for a given UE corresponds to the number of multiple bits assigned to the given UE. Note that assignment of just a single bit per bit group, as in the example above, may be considered a special case of one-bit sub-stream groups. Bit-level protection for multi-bit assignments might then be determined by considering occurrences of pairwise confusion between modulation data symbols due to misidentification of bit values of multiple specific bit positions. Note that determining the frequency of occurrence of such errors could involve consideration of pairs of constellation points that are more distant from each other than just immediate adjacency.

Figure 8:
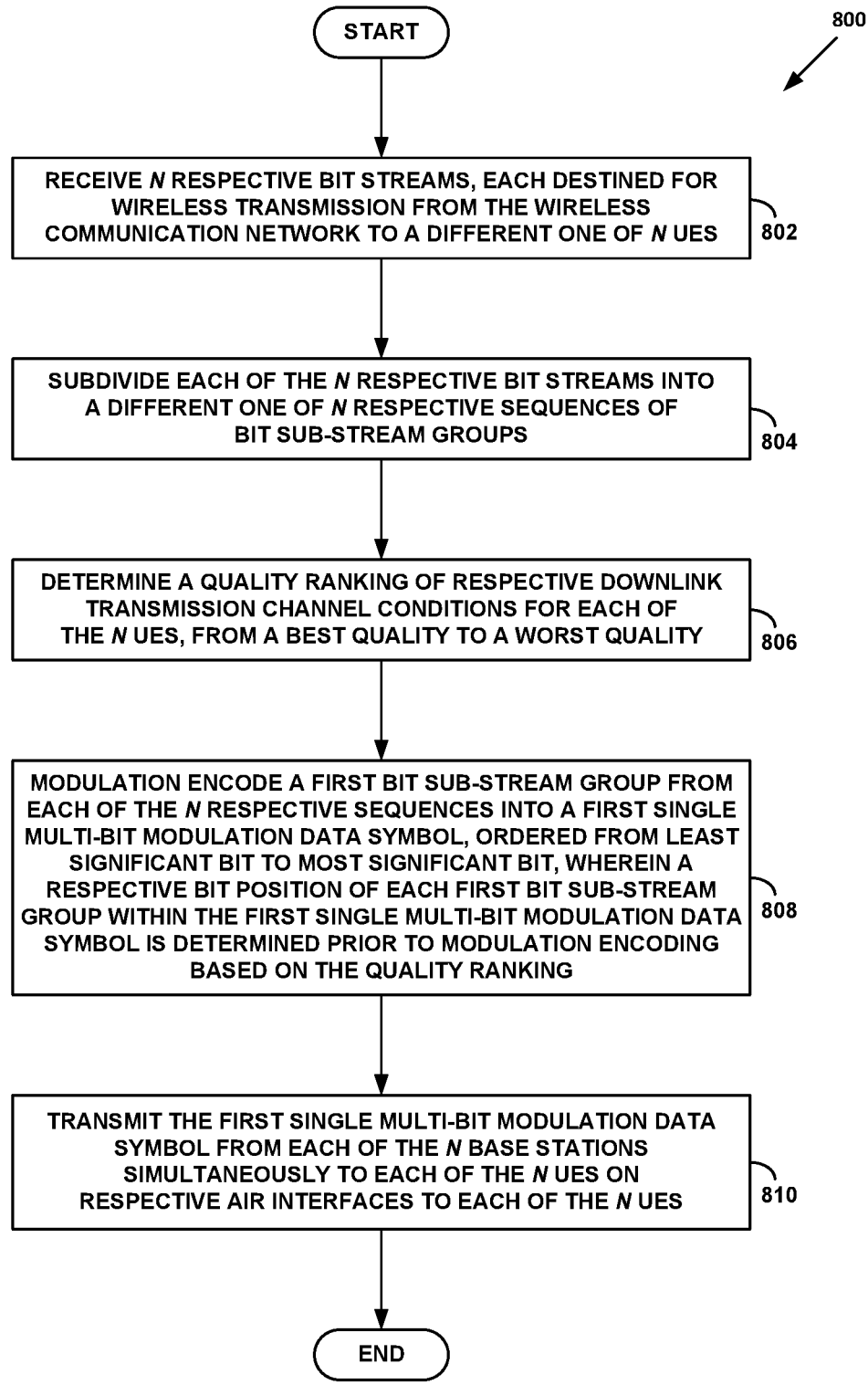
FIG. 8 is a flow chart depicting still further example operations in accordance with the present disclosure.

FIGS. 8 and 9 are flowcharts illustrating example methods 700 and 800, according to example embodiments. Example methods, such as methods 700 and 800, may be carried out in whole or in part a wireless communication network by one or more base stations and/or other components, such as by base stations $BS_A$, $BS_B$, and/or $BS_C$ shown in FIG. 1. These base stations are examples of a network device or component that could be configured to carry out the example methods 700 and 700. However, it should be understood that example methods, such as methods 700 and 800, may be carried out by other entities or combinations of entities as well as in other arrangements, without departing from the scope of the invention. For example, the methods 700 and/or 800 may be carried out by a serving base station and a CoMP base station, and may further involve actions by a centralized controlling/coordinating entity. By way of example, the methods 700 and 800 can be implemented as machine language instructions that can be stored on non-transient machine-readable media (e.g, solid state memory, magnetic disk, etc), and that when executed by one or more processors of a base station to cause the base station to carry out operations, steps, and/or functions of the method.

In an example embodiments, methods 700 and 800 may operable in a wireless communication network including first base stations configured for serving one or more user equipment devices (UEs). Example methods 700 and 800 both illustrate application of bit-level protection. Both methods share certain aspects in common, but differ in other aspects. Method 700 is described first.

Figure 7:
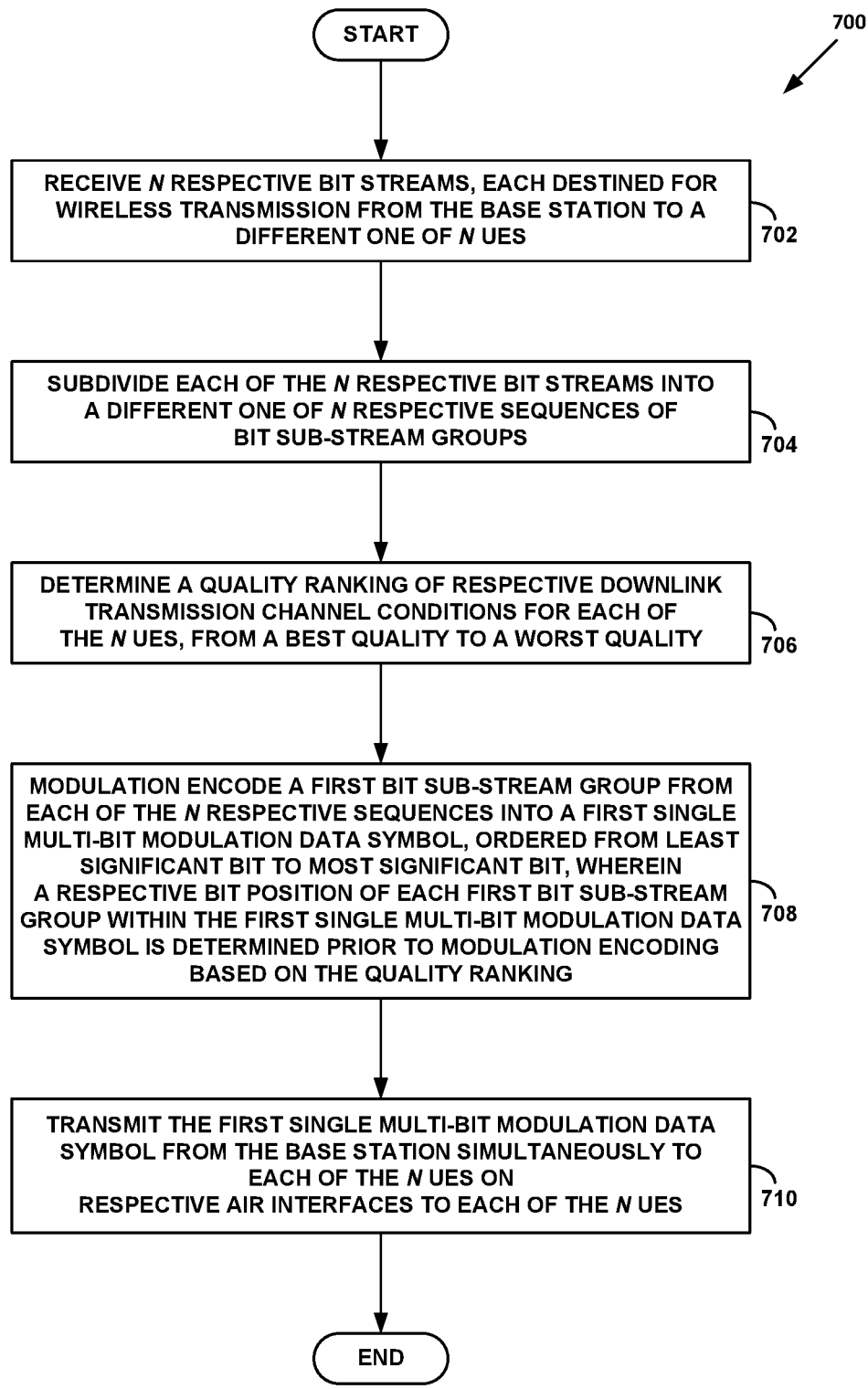
FIG. 7 is a flow chart depicting further example operations in accordance with the present disclosure.

As shown by block 702 in FIG. 7, method 700 involves receiving N respective bit streams, each destined for wireless transmission from the base station to a different one of N UEs. Here, N is a positive integer.

As shown by block 704 in FIG. 7, method 700 next involves subdividing each of the N respective bit streams into a different one of N respective sequences of bit substream groups. The bit sub-stream group of each respective bit stream could be one or more bits.

As shown by block 706 in FIG. 7, method 700 next involves determining a quality ranking of respective downlink transmission channel conditions for each of the N UEs, from a best quality to a worst quality. The quality ranking could be a ranking of a metric, such as signal-to-noise ratio.

As shown by block 708 in FIG. 7, method 700 next involves modulation encoding a first bit sub-stream group from each of the N respective sequences into a first single multi-bit modulation data symbol, ordered from least significant bit (LSB) to most significant bit (MSB). That is, there are N first bit sub-stream groups, one from each of the N respective sequences. Each first bit sub-stream group will be placed at a respective bit position within the first single multi-bit modulation data symbol, such that each respective bit position placement is determined prior to modulation encoding based on the quality ranking.

Finally, as shown by block 710, method 700 next involves transmitting the first single multi-bit modulation data symbol from the base station simultaneously to each of the N UEs on respective air interfaces to each of the N UEs.

In accordance with example embodiments, the method 700 may further entail modulation encoding a second bit sub-stream group from each of the N respective sequences into a second single multi-bit modulation data symbol, again ordered from LSB to MSB. That is, there are N second bit sub-stream groups, one from each of the N respective sequences. Each second bit sub-stream group will be placed at a respective bit position within the second single multi-bit modulation data symbol, such that each respective bit position placement is determined prior to modulation encoding based on the quality ranking. The second single multi-bit modulation data symbol will then be transmitted from the base station simultaneously to each of the N UEs on respective air interfaces to each of the N UEs.

Also in accordance with example embodiments, the wireless communication network may be operated according to LTE, so that transmitting the first and second single multi-bit modulation data symbols from the base station simultaneously to each of the N UEs on respective air interfaces to each of the N UEs will entail transmitting the first and second single multi-bit modulation data symbols as respective orthogonal frequency division multiplex (OFDM) resource elements in a common resource block.

In accordance with example embodiments, the base station may be one of N base stations, each one of which is a serving base station to a different one of the N UEs, and each one of which is a secondary base station to each of the N UEs except for the UE it is serving. In this arrangement, determining the quality ranking of respective downlink transmission channel conditions for each of the N UEs may entail determining for each of the N UEs aggregate channel conditions of combined, concurrent, identical transmissions from each of the N base stations on respective air interface downlinks. Further, transmitting the first and second single multi-bit modulation data symbols from the base station simultaneously to each of the N UEs on respective air interfaces to each of the N UEs may entail transmitting the first and second single multi-bit modulation data symbols concurrently from all N base stations in respective simultaneous transmissions to each of the N UEs on respective air interfaces to each of the N UEs.

In the multi-base station configuration, where the wireless communication network operates according to LTE, the N base stations may serve each of the N UEs according to downlink coordinated multi-point (CoMP) transmission. Then, transmitting the first and second single multi-bit modulation data symbols concurrently from all N base stations in respective simultaneous transmissions to each of the N UEs on respective air interfaces to each of the N UEs could comprise transmitting the first and second single multi-bit modulation data symbols as respective OFDM resource elements in a respective common resource block from each of the N base stations, according to downlink CoMP.

In further accordance with implementation in an LTE system, modulation encoding the first bit sub-stream group from each of the N respective sequences into the first single multi-bit modulation data symbol could entail determining a modulation encoding scheme (MCS) for generating M-bit data symbols, where M is a positive integer. As described above the M-bit data symbols can be mathematically represented as a constellation of points in an I-Q plane. Modulation encoding the first single multi-bit modulation symbol could further entail determining bit-level error protections of bit positions within the M-bit data symbols according to a frequency of occurrence of pairs of constellation points representing two M-bit data symbols that differ in value by one or more bits in one or more given bit positions, assigning a bit position with the highest bit-level protection to the first bit sub-stream group from the sequence for the UE with the worst quality ranking of downlink transmission channel conditions, and applying the MCS to the first bit sub-stream groups from the N respective sequences to generate the first single multi-bit modulation data symbol as an M-bit data symbol. As described above, the bit-level error protection for the one or more given bit positions increases with decreasing frequency of occurrence, and decreases with increasing frequency of occurrence. The first bit sub-stream group from the sequence for the UE with the worst quality ranking of downlink transmission channel conditions will be placed at the assigned bit position within the M-bit data symbol.

In and example embodiment, the pairs of constellation points are pairs of adjacent constellation points in the I-Q plane. However, other configurations of proximity in the I-Q plane can be used.

In accordance with example embodiments, the determined MCS may be associated with a plurality of alternative constellation mappings of M-bit data symbols. In this case, assigning the bit position with the highest bit-level protection to the first bit sub-stream group from the sequence for the UE with the worst quality ranking of downlink transmission channel conditions could entail selecting a particular constellation mapping from among the plurality so as to achieve the assignment. An example would be the different bit-labeling schemes of two or more 16QAM schemes, as described above.

In accordance with example embodiments, the MCS could one of QPSK, 8PSK, 16QAM, 64QAM, or 256QAM. Other MCSs are possible as well.

Next, FIG. 8 describes the example method 800, which may be carried out in a wireless communication network including at least N base stations configured for serving one or more UEs. Again, N is a positive integer.

As shown by block 802 in FIG. 8, method 800 involves receiving N respective bit streams, each destined for wireless transmission from the wireless communication network station to a different one of N UEs.

As shown by block 804 in FIG. 8, method 800 next involves subdividing each of the N respective bit streams into a different one of N respective sequences of bit sub-stream groups. Again, the bit sub-stream group of each respective bit stream could be one or more bits.

As shown by block 806 in FIG. 8, method 800 next involves determining a quality ranking of respective downlink transmission channel conditions for each of the N UEs, from a best quality to a worst quality. The quality ranking could once more be a ranking of a metric, such as signal-to-noise ratio.

As shown by block 808 in FIG. 8, method 800 next involves modulation encoding a first bit sub-stream group from each of the N respective sequences into a first single multi-bit modulation data symbol, ordered from least significant bit (LSB) to most significant bit (MSB). A respective bit position of each first bit sub-stream group within the first single multi-bit modulation data symbol would be determined prior to modulation encoding based on the quality ranking.

Finally, as shown by block 810, method 800 next involves transmitting the first single multi-bit modulation data symbol from each of the N base stations simultaneously to each of the N UEs on respective air interfaces to each of the N UEs.

In accordance with example embodiments, the method 800 may further entail modulation encoding a second bit sub-stream group from each of the N respective sequences into a second single multi-bit modulation data symbol, ordered once more from LSB to MSB. The respective bit position of each second bit sub-stream group within the second single multi-bit modulation data symbol will be determined prior to modulation encoding, based on the quality ranking. The second single multi-bit modulation data symbol will then be transmitted from the base station simultaneously to each of the N UEs on respective air interfaces to each of the N UEs.

Also in accordance with example embodiments each of the N base stations may be a serving base station to a different one of the N UEs, and each of the N base stations may be a secondary base station to each of the N UEs except for the UE it is serving. Then, determining the quality ranking of respective downlink transmission channel conditions for each of the N UEs may entail determining for each of the N UEs aggregate channel conditions of combined, concurrent, identical transmissions from each of the N base stations on respective air interface downlinks. In addition, transmitting the first and second single multi-bit modulation data symbols from each of the N base stations simultaneously to each of the N UEs on respective air interfaces to each of the N UEs may entail transmitting the first and second single multi-bit modulation data symbols concurrently from all N base stations in respective simultaneous transmissions to each of the N UEs on respective air interfaces to each of the N UEs.

In an example embodiment, the wireless communication network may operate according to LTE, and the N base stations may serve each of the N UEs according to downlink coordinated multi-point (CoMP) transmission. In this arrangement, transmitting the first and second single multi-bit modulation data symbols concurrently from all N base stations in respective simultaneous transmissions to each of the N UEs on respective air interfaces to each of the N UEs could entail transmitting the first and second single multi-bit modulation data symbols as respective orthogonal frequency division multiplex (OFDM) resource elements in a respective common resource block from each of the N base stations, according to downlink CoMP.

In accordance with example embodiments, modulation encoding the first bit sub-stream group from each of the N respective sequences into the first single multi-bit modulation data symbol could comprise determining a MCS for generating M-bit data symbols, again, where M is a positive integer, and the M-bit data symbols are mathematically represented as a constellation of points in an I-Q plane. Then, bit-level error protections of bit positions within the M-bit data symbols may be determined according to a frequency of occurrence of pairs of constellation points representing two M-bit data symbols that differ in value by one or more bits in one or more given bit positions, such that the bit-level error protection for the one or more given bit positions increases with decreasing frequency of occurrence, and decreases with increasing frequency of occurrence. A bit position with the highest bit-level protection may then be assigned to the first bit sub-stream group from the sequence for the UE with the worst quality ranking of downlink transmission channel conditions. Conversely, a bit position with the lowest bit-level protection may be assigned to the first bit sub-stream group from the sequence for the UE with the highest quality ranking of downlink transmission channel conditions. Thus, applying the MCS to the first bit sub-stream groups from the N respective sequences generates the first single multi-bit modulation data symbol as an M-bit data symbol such that the first bit sub-stream group from the sequence for the UE with the worst quality ranking of downlink transmission channel conditions and the first bit sub-stream group from the sequence for the UE with the highest quality ranking of downlink transmission channel conditions are each placed at their respectively assigned bit position within the M-bit data symbol.

In accordance with example embodiments, the MCS could one of QPSK, 8PSK, 16QAM, 64QAM, or 256QAM. Further, determining the MCS could entail determining signal-to-noise properties of respective downlink air interfaces from the N base stations to each of the N UEs.

It will be appreciated that the example methods 700 and 800 could each include alternate and/or additional steps, while still remaining within the scope and spirit of example embodiments herein.

Exemplary embodiments have been described above. Those skilled in the art will understand, however, that changes and modifications may be made to these embodiments without departing from the true scope and spirit of the invention.

We claim:

1. A method operable in a wireless communication network including a base station configured for serving one or more user equipment devices (UEs), the method comprising:

receiving N respective bit streams, each destined for wireless transmission from the base station to a different one of N UEs, wherein N is a positive integer;

subdividing each of the N respective bit streams into a different one of N respective sequences of bit sub-stream groups;

determining a quality ranking of respective downlink transmission channel conditions for each of the N UEs, from a best quality to a worst quality;

modulation encoding a first bit sub-stream group from each of the N respective sequences into a first single multi-bit modulation data symbol, ordered from least significant bit (LSB) to most significant bit (MSB), wherein a respective bit position of each first bit sub-stream group within the first single multi-bit modulation data symbol is determined prior to modulation encoding based on the quality ranking; and transmitting the first single multi-bit modulation data symbol from the base station simultaneously to each of the N UEs on respective air interfaces to each of the N UEs.

2. The method of claim 1, further comprising:

modulation encoding a second bit sub-stream group from each of the N respective sequences into a second single multi-bit modulation data symbol, ordered from LSB to MSB, wherein the respective bit position of each second bit sub-stream group within the second single multi-bit modulation data symbol is determined prior to modulation encoding based on the quality ranking; and transmitting the second single multi-bit modulation data symbol from the base station simultaneously to each of the N UEs on respective air interfaces to each of the N UEs.

3. The method of claim 2, wherein the wireless communication network operates according to LTE, and wherein transmitting the first and second single multi-bit modulation data symbols from the base station simultaneously to each of the N UEs on respective air interfaces to each of the N UEs comprises transmitting the first and second single multi-bit modulation data symbols as respective orthogonal frequency division multiplex (OFDM) resource elements in a common resource block.

4. The method of claim 2, wherein the base station is one of N base stations, each one of which is a serving base station to a different one of the N UEs, and each one of which is a secondary base station to each of the N UEs except for the UE it is serving, wherein determining the quality ranking of respective downlink transmission channel conditions for each of the N UEs comprises determining for each of the N UEs aggregate channel conditions of combined, concurrent, identical transmissions from each of the N base stations on respective air interface downlinks, and wherein transmitting the first and second single multi-bit modulation data symbols from the base station simultaneously to each of the N UEs on respective air interfaces to each of the N UEs comprises transmitting the first and second single multi-bit modulation data symbols concurrently from all N base stations in respective simultaneous transmissions to each of the N UEs on respective air interfaces to each of the N UEs.

5. The method of claim 4, wherein the wireless communication network operates according to LTE, wherein the N base stations serve each of the N UEs according to downlink coordinated multi-point (CoMP) transmission, and wherein transmitting the first and second single multi-bit modulation data symbols concurrently from all N base stations in respective simultaneous transmissions to each of the N UEs on respective air interfaces to each of the N UEs comprises transmitting the first and second single multi-bit modulation data symbols as respective orthogonal frequency division multiplex (OFDM) resource elements in a respective common resource block from each of the N base stations, according to downlink CoMP.

6. The method of claim 1, wherein modulation encoding the first bit sub-stream group from each of the N respective sequences into the first single multi-bit modulation data symbol comprises:

determining a modulation encoding scheme (MCS) for generating M-bit data symbols, wherein M is a positive integer, and the M-bit data symbols are mathematically represented as a constellation of points in an I-Q plane;

determining bit-level error protections of bit positions within the M-bit data symbols according to a frequency of occurrence of pairs of constellation points representing two M-bit data symbols that differ in value by one or more bits in one or more given bit positions, wherein the bit-level error protection for the one or more given bit positions increases with decreasing frequency of occurrence, and decreases with increasing frequency of occurrence;

assigning a bit position with the highest bit-level protection to the first bit sub-stream group from the sequence for the UE with the worst quality ranking of downlink transmission channel conditions; and applying the MCS to the first bit sub-stream groups from the N respective sequences to generate the first single multi-bit modulation data symbol as an M-bit data symbol, wherein the first bit sub-stream group from the sequence for the UE with the worst quality ranking of downlink transmission channel conditions is placed at the assigned bit position within the M-bit data symbol.

7. The method of claim 6, wherein the pairs of constellation points are pairs of adjacent constellation points in the I-Q plane.

8. The method of claim 6, wherein the determined MCS is associated with a plurality of alternative constellation mappings of M-bit data symbols, and wherein assigning the bit position with the highest bit-level protection to the first bit sub-stream group from the sequence for the UE with the worst quality ranking of downlink transmission channel conditions comprises selecting a particular constellation mapping from among the plurality so as to achieve the assignment.

9. The method of claim 6, wherein the MCS is one of QPSK, 8PSK, 16QAM, 64QAM, or 256QAM.

10. A method operable in a wireless communication network including at least N base stations configured for serving one or more user equipment devices (UEs), wherein N is a positive integer, the method comprising:

receiving N respective bit streams, each destined for wireless transmission from the wireless communication network station to a different one of N UEs;

subdividing each of the N respective bit streams into a different one of N respective sequences of bit sub-stream groups;

determining a quality ranking of respective downlink transmission channel conditions for each of the N UEs, from a best quality to a worst quality;

modulation encoding a first bit sub-stream group from each of the N respective sequences into a first single multi-bit modulation data symbol, ordered from least significant bit (LSB) to most significant bit (MSB), wherein a respective bit position of each first bit sub-stream group within the first single multi-bit modulation data symbol is determined prior to modulation encoding based on the quality ranking; and transmitting the first single multi-bit modulation data symbol from each of the N base stations simultaneously to each of the N UEs on respective air interfaces to each of the N UEs.

11. The method of claim 10, further comprising:

modulation encoding a second bit sub-stream group from each of the N respective sequences into a second single multi-bit modulation data symbol, ordered from LSB to MSB, wherein the respective bit position of each second bit sub-stream group within the second single multi-bit modulation data symbol is determined prior to modulation encoding based on the quality ranking; and transmitting the second single multi-bit modulation data symbol from each of the N base stations simultaneously to each of the N UEs on respective air interfaces to each of the N UEs.

12. The method of claim 11, wherein each of the N base stations is a serving base station to a different one of the N UEs, and each of the N base stations is a secondary base station to each of the N UEs except for the UE it is serving, wherein determining the quality ranking of respective downlink transmission channel conditions for each of the N UEs comprises determining for each of the N UEs aggregate channel conditions of combined, concurrent, identical transmissions from each of the N base stations on respective air interface downlinks, and wherein transmitting the first and second single multi-bit modulation data symbols from each of the N base stations simultaneously to each of the N UEs on respective air interfaces to each of the N UEs comprises transmitting the first and second single multi-bit modulation data symbols concurrently from all N base stations in respective simultaneous transmissions to each of the N UEs on respective air interfaces to each of the N UEs.

13. The method of claim 12, wherein the wireless communication network operates according to LTE, wherein the N base stations serve each of the N UEs according to downlink coordinated multi-point (CoMP) transmission, and wherein transmitting the first and second single multi-bit modulation data symbols concurrently from all N base stations in respective simultaneous transmissions to each of the N UEs on respective air interfaces to each of the N UEs comprises transmitting the first and second single multi-bit modulation data symbols as respective orthogonal frequency division multiplex (OFDM) resource elements in a respective common resource block from each of the N base stations, according to downlink CoMP.

14. The method of claim 10, wherein modulation encoding the first bit sub-stream group from each of the N respective sequences into the first single multi-bit modulation data symbol comprises:

determining a modulation encoding scheme (MCS) for generating M-bit data symbols, wherein M is a positive integer, and the M-bit data symbols are mathematically represented as a constellation of points in an I-Q plane;

determining bit-level error protections of bit positions within the M-bit data symbols according to a frequency of occurrence of pairs of constellation points representing two M-bit data symbols that differ in value by one or more bits in one or more given bit positions, wherein the bit-level error protection for the one or more given bit positions increases with decreasing frequency of occurrence, and decreases with increasing frequency of occurrence;

assigning a bit position with the highest bit-level protection to the first bit sub-stream group from the sequence for the UE with the worst quality ranking of downlink transmission channel conditions;

assigning a bit position with the lowest bit-level protection to the first bit sub-stream group from the sequence for the UE with the highest quality ranking of downlink transmission channel conditions; and applying the MCS to the first bit sub-stream groups from the N respective sequences to generate the first single multi-bit modulation data symbol as an M-bit data symbol, wherein the first bit sub-stream group from the sequence for the UE with the worst quality ranking of downlink transmission channel conditions and the first bit sub-stream group from the sequence for the UE with the highest quality ranking of downlink transmission channel conditions are each placed at their respectively assigned bit position within the M-bit data symbol.

15. The method of claim 14, wherein the MCS is one of QPSK, 8PSK, 16QAM, 64QAM, or 256QAM, and wherein determining the MCS comprises determining signal-to-noise properties of respective downlink air interfaces from the N base stations to each of the N UEs.

16. A wireless communication network comprising:

N base stations configured for serving one or more user equipment devices (UEs), wherein N is a positive integer;

one or more processors distributed at least among the N base stations; and memory accessible to the one or more processors, and storing machine language instructions that, upon execution by the one or more processors, cause the wireless communication network to carry out operations including:

receiving N respective bit streams, each destined for wireless transmission from the wireless communication network station to a different one of N UEs;

subdividing each of the N respective bit streams into a different one of N respective sequences of bit sub-stream groups;

determining a quality ranking of respective downlink transmission channel conditions for each of the N UEs, from a best quality to a worst quality;

modulation encoding a first bit sub-stream group from each of the N respective sequences into a first single multi-bit modulation data symbol, ordered from least significant bit (LSB) to most significant bit (MSB), wherein a respective bit position of each first bit sub-stream group within the first single multi-bit modulation data symbol is determined prior to modulation encoding based on the quality ranking; and transmitting the first single multi-bit modulation data symbol from each of the N base stations simultaneously to each of the N UEs on respective air interfaces to each of the N UEs.

17. The wireless communication network of claim 16, wherein the operations further include:

modulation encoding a second bit sub-stream group from each of the N respective sequences into a second single multi-bit modulation data symbol, ordered from LSB to MSB, wherein the respective bit position of each second bit sub-stream group within the second single multi-bit modulation data symbol is determined prior to modulation encoding based on the quality ranking; and transmitting the second single multi-bit modulation data symbol from each of the N base stations simultaneously to each of the N UEs on respective air interfaces to each of the N UEs.

18. The wireless communication network of claim 17, wherein the wireless communication network operates according to LTE, wherein the N base stations serve each of the N UEs according to downlink coordinated multi-point (CoMP) transmission, each of the N base stations being a primary serving CoMP base station to a different one of the N UEs, and each of the N base stations being a secondary CoMP base station to each of the N UEs except for the UE it is serving, wherein determining the quality ranking of respective downlink transmission channel conditions for each of the N UEs comprises determining for each of the N UEs aggregate channel conditions of combined, concurrent, transmissions from each of the N base stations on respective air interface downlinks, according to downlink CoMP, and wherein transmitting the first and second single multi-bit modulation data symbols from each of the N base stations simultaneously to each of the N UEs on respective air interfaces to each of the N UEs comprises transmitting the first and second single multi-bit modulation data symbols as respective orthogonal frequency division multiplex (OFDM) resource elements in a respective common resource block from each of the N base stations, according to downlink CoMP.

19. The wireless communication network of claim 16, wherein modulation encoding the first bit sub-stream group from each of the N respective sequences into the first single multi-bit modulation data symbol comprises:

determining a modulation encoding scheme (MCS) for generating M-bit data symbols, wherein M is a positive integer, and the M-bit data symbols are mathematically represented as a constellation of points in an I-Q plane;

determining bit-level error protections of bit positions within the M-bit data symbols according to a frequency of occurrence of pairs of constellation points representing two M-bit data symbols that differ in value by one or more bits in one or more given bit positions, wherein the bit-level error protection for the one or more given bit positions increases with decreasing frequency of occurrence, and decreases with increasing frequency of occurrence;

assigning a bit position with the highest bit-level protection to the first bit sub-stream group from the sequence for the UE with the worst quality ranking of downlink transmission channel conditions;

assigning a bit position with the lowest bit-level protection to the first bit sub-stream group from the sequence for the UE with the highest quality ranking of downlink transmission channel conditions; and applying the MCS to the first bit sub-stream groups from the N respective sequences to generate the first single multi-bit modulation data symbol as an M-bit data symbol, wherein the first bit sub-stream group from the sequence for the UE with the worst quality ranking of downlink transmission channel conditions and the first bit sub-stream group from the sequence for the UE with the highest quality ranking of downlink transmission channel conditions are each placed at their respectively assigned bit position within the M-bit data symbol.

20. The wireless communication network of claim 19, wherein the MCS is one of QPSK, 8PSK, 16QAM, 64QAM, or 256QAM, and wherein determining the MCS comprises determining signal-to-noise properties of respective downlink air interfaces from the N base stations to each of the N UEs.

* * * * *